United States Patent [19]

Coonradt

[11] Patent Number: 4,966,300
[45] Date of Patent: Oct. 30, 1990

[54] INSULATED DRINKING CONTAINER

[76] Inventor: Robert A. Coonradt, 8851 Vamo Rd., Sarasota, Fla. 34231

[21] Appl. No.: 496,863

[22] Filed: Mar. 21, 1990

[51] Int. Cl.⁵ .............................................. A47G 19/22
[52] U.S. Cl. ..................................... 220/90.2; 215/229
[58] Field of Search ............................. 220/90.2, 90.4; 215/229

[56] References Cited

U.S. PATENT DOCUMENTS

| 3,558,033 | 1/1971 | Leeds | 220/90.2 |
| 4,109,817 | 8/1978 | Payne | 220/90.2 |
| 4,165,013 | 8/1979 | Lutz | 220/90.4 |
| 4,291,814 | 9/1981 | Conn | 220/90.4 |

FOREIGN PATENT DOCUMENTS 15572 of 1891 United Kingdom ............... 220/90.4

Primary Examiner—George E. Lowrance
Attorney, Agent, or Firm—Charles J. Prescott

[57] ABSTRACT

An insulated drinking container having an insulated cup and an insulated lid which is shreadably engagable over the open upper end of the cup. The lid includes an integrally formed grasping handle and an elongated centrally disposed, downwardly extending straw housing. The straw housing includes a stationary straw which extends downward to the bottom of the cup and a removable straw slidably translatable up and down in the stationary housing adjacent the stationary straw between a downward stored position fully within the straw housing and an upward sipping position extended above the lid. Only when in its sipping position is the removable straw, having an aperture formed through its wall for this purpose, in fluid communication with the stationary straw so that liquid in the container may be removed. Pressurizing and suction features which automatically urge the removable straw upward to its sipping position and downward to its stored position are also disclosed.

10 Claims, 3 Drawing Sheets

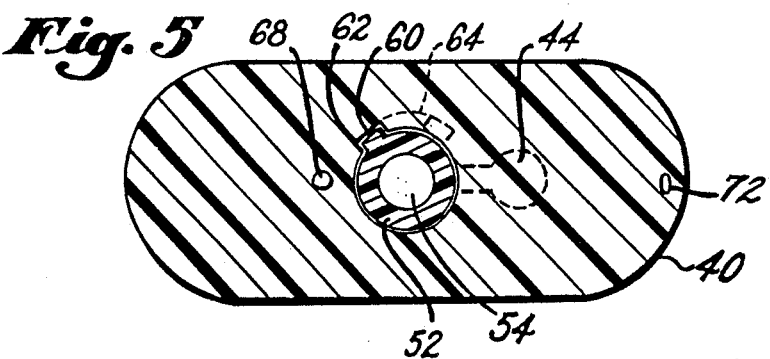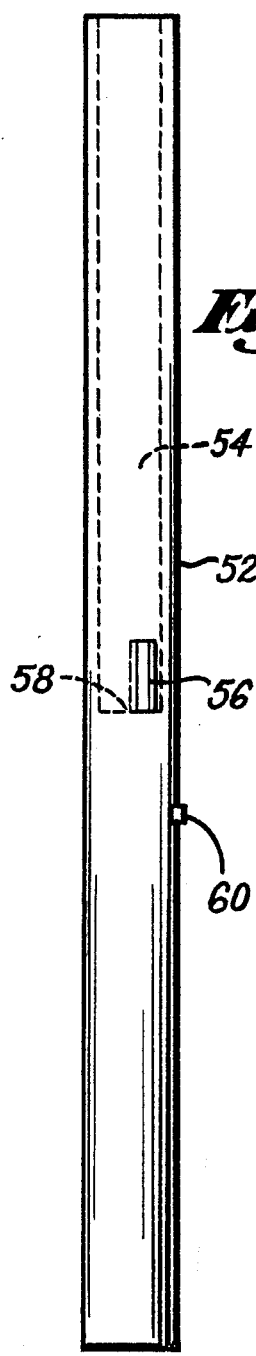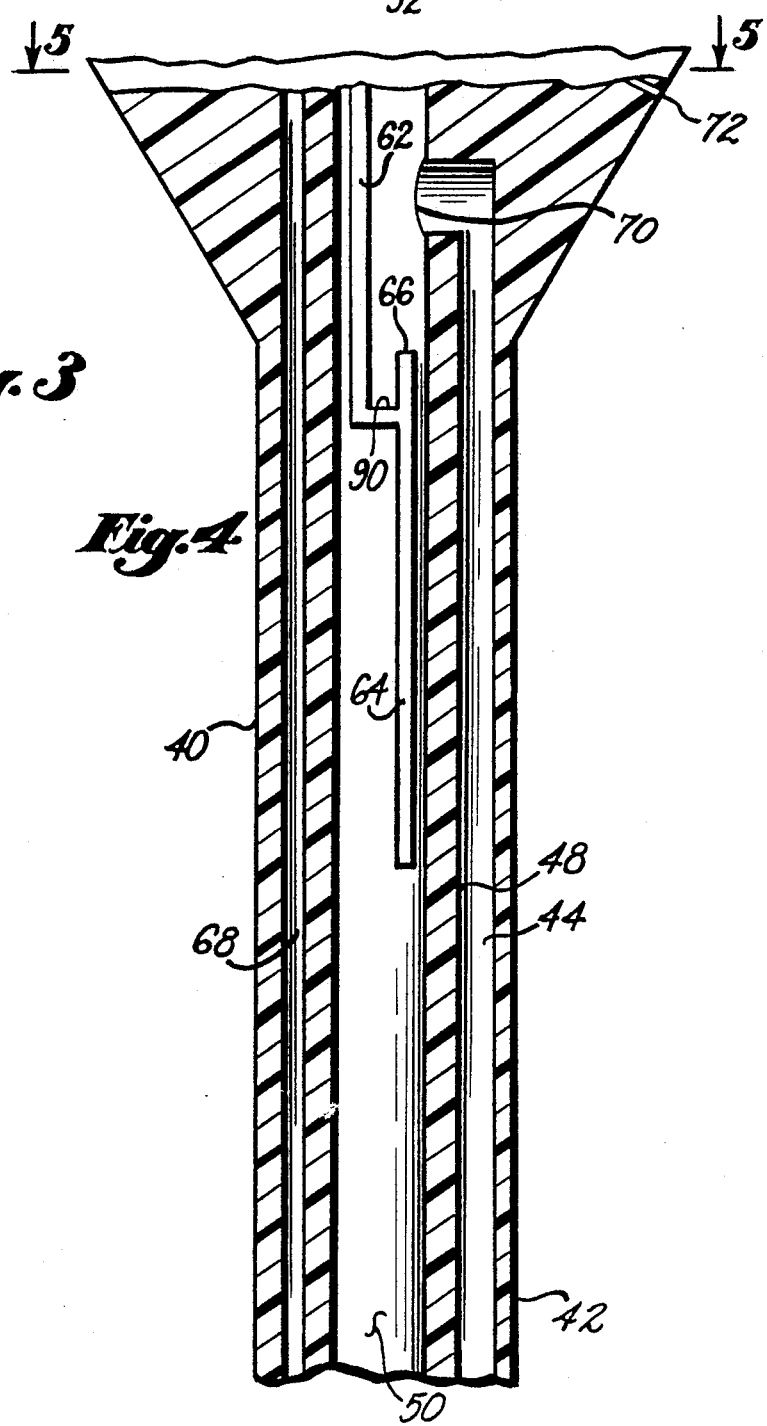

INSULATED DRINKING CONTAINER

BACKGROUND OF THE INVENTION

The present invention relates generally to drinking containers, and more particularly to a non-spillable insulated drinking container which includes an automatically extendable and retractable straw mechanism.

The need for sealed liquid containers which may be used without spilling the liquid contents contained therein is well known, especially in situations such as driving and during other activities where the container might be jostled or upset or is otherwise in an unstable environment. Additionally, an insulation feature which maintains the liquid contained therein either in a cooled or heated condition is also desirable. Further, many users prefer to consume the liquid by sipping on a straw rather than drinking from an opened container to further limit the possibility of spilling the liquid.

Two patents known to applicant disclose containers having an integrally formed straw housings Finch and Leeds U.S. Pat. Nos. 4,016,998 and 3,558,033. U.S. Pat. No. 3,220,587 to Griffin also discloses a cover for a container having a straw housing integrally formed within which there is disposed a projectable straw.

U.S. Pat. No. 2,805,809 to Pugh also discloses the provision of a straw housing integrally formed with the cover of the container having a projectable straw which extends outwardly from the cover through an aperture normally covered by a flap. A later patent to Pugh, U.S. Pat. No. 3,263,855 also discloses a flexible straw in conjunction with a container which includes a lid having a tear out strip, the flexible straw attached to the tear out strip and confined within the container until the tear out strip is removed.

The Vannucci U.S. Pat. No. 4,461,406 discloses a container in which an elongated resilient straw is positioned and held thusly until a sealed closure atop the container is removed. An automatic straw emerging device is also disclosed in U.S. Pat. No. 4,537,324 to Wang. This invention, which is structured to be incorporated into a conventional beverage can which is sealed by a sealing tap which, when pulled, releases the flexible straw for use.

U.S. Pat. No. 3,877,614 to Murphy discloses a container having a cover threadably secured thereon which is integrally provided with a handle. The handle includes a compressible portion which develops pressurized air for dispensing liquid from the container. No sipping straw is provided.

The present invention provides an insulated container having a removable sipping straw which is extendable from a sealed container by the application of air pressure at the bottom of the straw to force it upwardly into fluid communication with a stationary straw which downwardly extends to the bottom of the container for suctioning fluid therefrom. Suction means are also provided to retract the removable straw back down into the container for storage.

BRIEF SUMMARY OF THE INVENTION

This invention is directed to an insulated drinking container having an insulated cup and an insulated lid which is shreadably engagable over the open upper end of the cup. The lid includes an integrally formed grasping handle and an elongated centrally disposed, downwardly extending straw housing. The straw housing includes a stationary straw which extends downward to the bottom of the cup and a removable straw slidably translatable up and down in the stationary housing adjacent the stationary straw between a downward stored position fully within the straw housing and an upward sipping position extended above the lid. Only when in its sipping position is the removable straw, having an aperture formed through its wall for this purpose, in fluid communication with the stationary straw so that liquid in the container may be removed. Pressurizing and suction features which automatically urge the removable straw upward to its sipping position and downward to its stored position are also disclosed.

It is therefore an object of this invention to provide an insulated, fully sealed container from which a removable straw may be urged upward into a sipping position by the application of air pressure to the bottom of the removable straw within the container which is otherwise sealable when not in use.

It is another object of this invention to provide an easily cleanable and serviceable reusable insulated sipping container.

It is yet another object of this invention to provide an integral air pressurization means to extend a removable straw from an otherwise sealed container into a sipping position and then to automatically retract the straw back down into the container when not in use.

It is yet another object of this invention to provide an insulated liquid container which may be used by sipping on a straw in one-handed fashion without concern for spilling the contents of the container.

In accordance with these and other objects which will become apparent hereinafter, the instant invention will now be described with reference to the accompanying drawings.

BRIEF DESCRIPTION OF THE DRAWINGS

FIG. 3 is a side elevation view of the removable straw

FIG. 4 is an enlarged left side section view of the straw housing portion of the molded lid.

FIG. 5 is a section view in the direction of arrows 5—5 in FIG. 4.

DETAILED DESCRIPTION OF THE INVENTION

Figure 1:
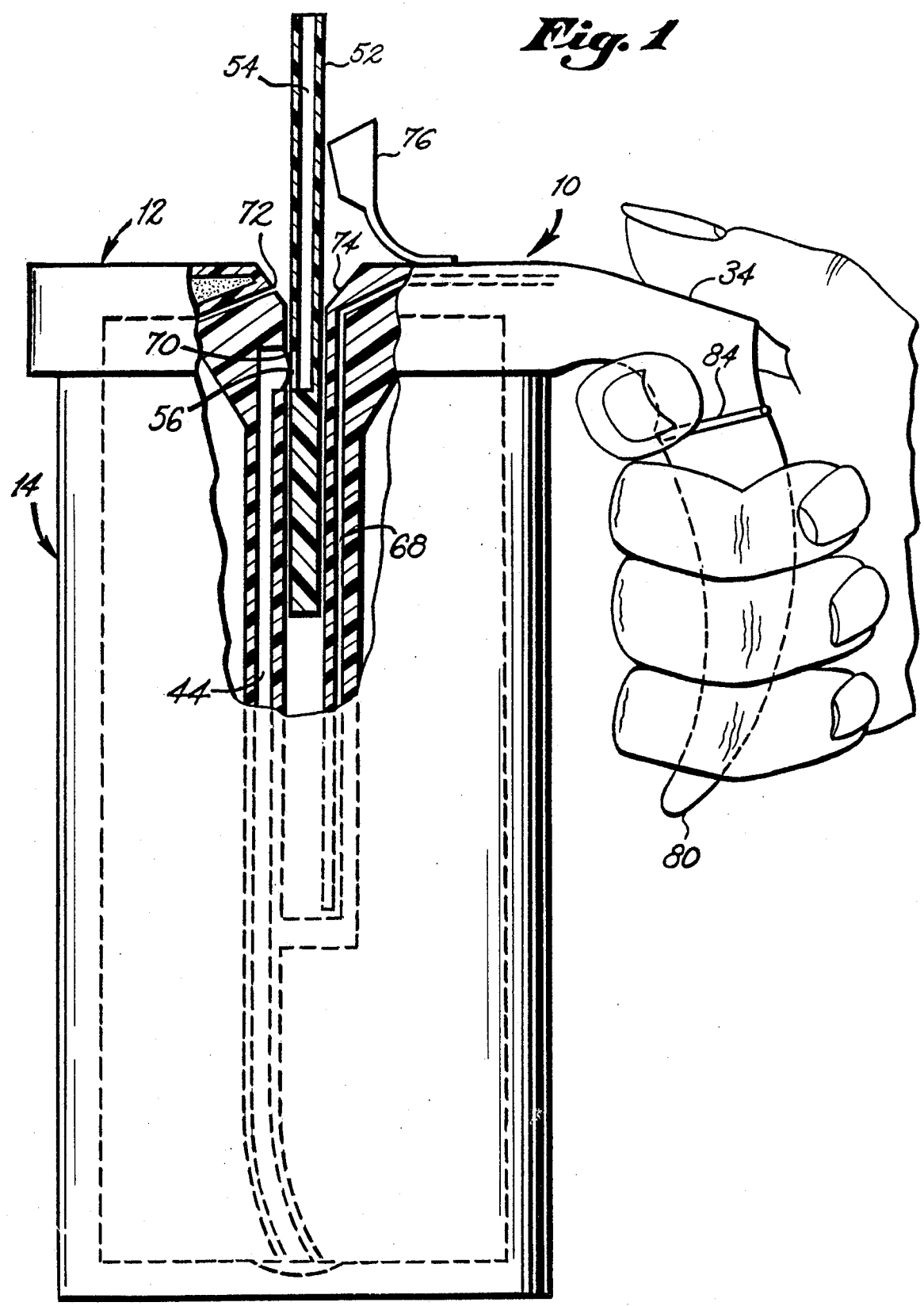
FIG. 1 is a right side elevation, partially broken view of the invention in use.

Referring now to the drawings, the invention is shown generally at numeral 10 and includes an integrally molded lid 12 and an insulated cup 14. The cup 14 is formed of mating outer and inner liners 16 and 18 held spaced apart by a layer of insulation 20. A recess 46 formed in the bottom of the inner liner 18 is also provided.

The lid 12 is also formed of an inner and outer wall 26 and 24, respectively, separated by a layer of insulation material 28. Lid 12 is structured having internal threads 32 which matably engage over threads 22 formed along the outer surface of the opening of the cup 14 as shown. Lid 12 also includes a laterally and downwardly extending handle 34 shaped for convenient grasping as shown. Handle 34 includes a longitudinally extending air passage 36 disposed as shown which functions as described herebelow. Fitted over handle 34 is a flexible, pliable cover 80 formed of molded rubber or neoprene. This cover 80 is sized so that an air chamber 82 is formed between it and handle 34. The cover 80 is sealably engaged by its rib 84 into groove 38 to form an airtight connection there between.

A small cover vent or aperture 86 is also provided in cover 80 which is positioned adjacent protrusion 88 so that, when a user places finger pressure against aperture 86, the inner surface of cover vent 86 contacts protrusion 88 to form an airtight seal therebetween and to create a completely sealed air chamber 82. Thus, the user, by squeezing cover 80 with finger pressure against aperture 86, creates air pressure within air chamber 82 and within air passage 36.

Lid 12 also includes integrally formed straw housing 40 which is centrally positioned and downwardly extends from the inner wall 26 of lid 12. This straw housing 40 includes a stationary straw 42 having an air passage 44 extending therealong and having port 70 at its upper end. Air passageway 36 extends through handle 34 into and longitudinally downward through straw housing 40 at 68 as shown.

The removable straw 52 is shown separately in FIG. 3 and is formed of a slender, elongated cylindrical member having a cavity 54 which extends from its upper end to a mid point at 58. Extending upwardly from the bottom 58 of cavity 54 through the sidewall is rectangular aperture 56. A locking lug 60 which protrudes from the cylindrical surface of removable straw 52 positioned slightly below aperture 56 is also provided.

Removable straw 52 is structured to slidably fit into lid aperture 74 and within cylindrical cavity 50 of straw housing 40. Absent removable straw 52, port 70 is in fluid communication with air passage 36 via cavity 50. However, when removable straw 52 is slidably placed fully within cavity 50 as shown in FIG. 2, fluid communication is blocked between air passage 36 and stationary straw passageway 44.

Figure 2:
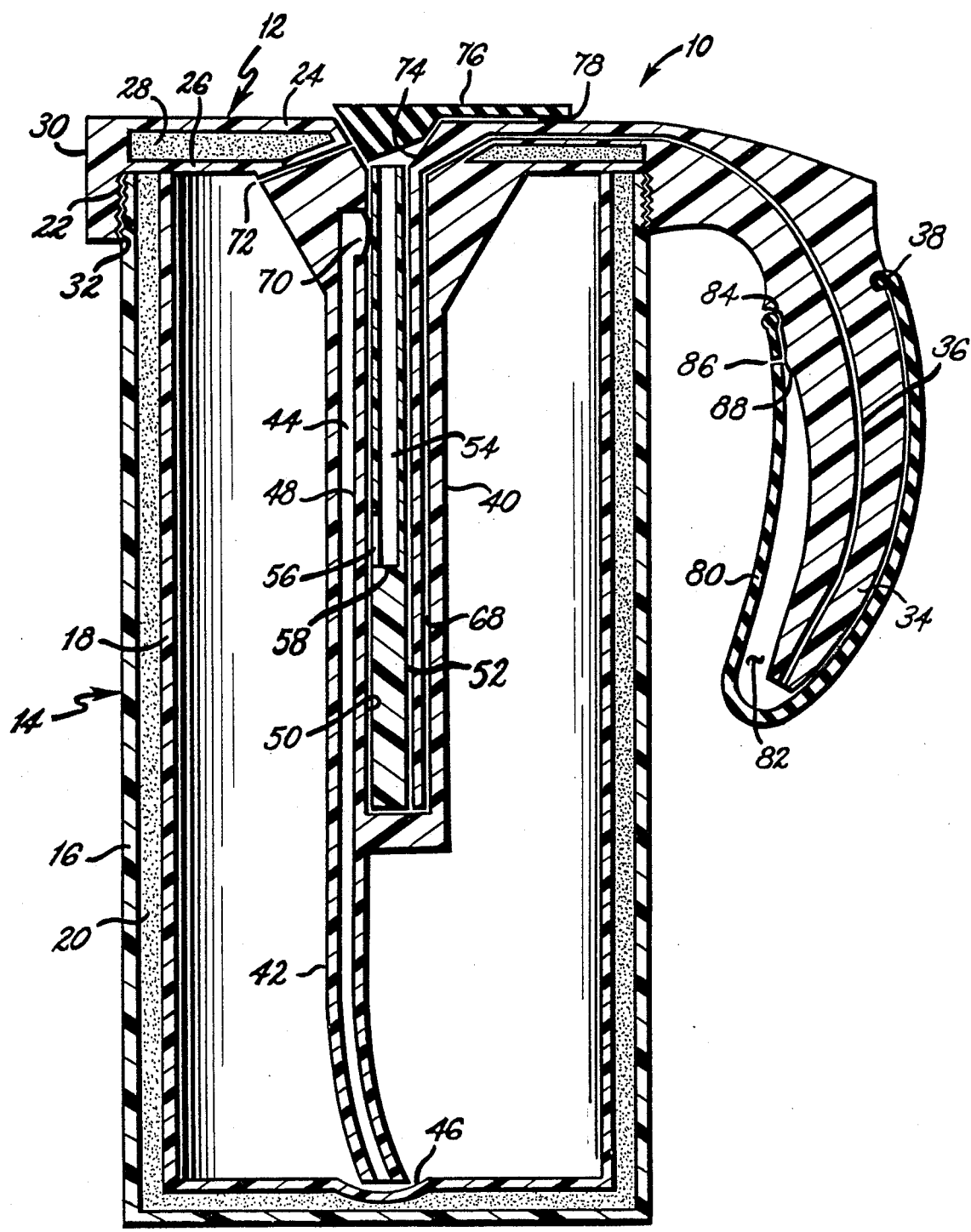
FIG. 2 is a right side elevation section view of FIG. 1 showing the removable straw in its stored position.

When the removable straw 52 is in its downward, stored position as shown in FIG. 2, liquid contained within cup 14 is prevented from escaping therefrom through stationary straw 42 because port 70 is sealed by the wall of removable straw 52. However, when the removable straw 52 is moved upwardly out through lid aperture 74 to its in use, sipping position as shown in FIG. 1, aperture 56 moves into alignment with port 70. In this configuration, liquid may be sipped through stationary straw 42 and out removable straw 52.

It should be now clear that the present invention provides for the automatic deployment of the removable straw 52 by squeezing action of flexible cover 80 while finger pressure is applied against cover vent 86. Pressurized air is delivered through air passages 36 and 68 against the bottom or lower solid end of removable straw 52 to urge it upward into the sipping position shown in FIG. 1.

To limit the upward movement of the removable straw 52, lug 60 slidably engages within and along a lower locking lug groove 64 formed longitudinally along passageway 50. When locking lug 60 contacts the upper end 66 of the lower locking lug groove 64, upward movement of the removable straw 52 is arrested However, to remove the removable straw 52 for cleaning, the user simply moves the removable straw 52 downward slightly so that locking lug 60 aligns with the lower end 90 of the upper locking lug groove 62. By slight rotation of the removable straw 52, the locking lug 60 is then aligned with the upper locking lug groove 62 so that the removable straw 52 may be removed.

In order to automatically retract the removable straw 52 downward into its stored position as shown in FIG. 2 after the removable straw 52 has been in use, the user simply needs to first squeeze the flexible handle cover 80, then place finger pressure on cover vent 86, and then release the cover 80. Because of the thickness of the resilient material used in cover 80, it tends to return to its normal size and shape. By this action, a vacuum is created in air chamber 82 which is translated against the bottom of removable straw 52 to retract same within cavity 50 to its stored position Should the user wish to take one sip of liquid and then immediately return the movable straw 52 to its stored position, the above-described procedure for extending the removable straw 52 is used; however, finger pressure over vent 86 is maintained while continuing to squeeze handle cover 80. When sipping is completed, the user simply releases squeezing pressure on handle cover 80 while maintaining finger pressure over cover vent 86. Thusly, the removable straw is drawn downwardly to its stored position.

Because the interior of container 10 is otherwise sealed, a lid vent 72 is also provided which diagonally extends from tapered lid aperture 74 to the interior of cup 14.

Thus, as liquid is sipped through removable straw 52, air is allowed to freely pass into the container to avoid creating a vacuum in the cup 14. In order to insure that any liquid contained within container 10 is not spilled, and any liquid that remains in the removable straw 52 is not spilled, when the removable straw 52 is not in use, a rubber lid seal 76, which is connected to the outer wall 24 of lid 12 at 78, is also provided. This lid seal 76 is sized and shaped to resiliently and sealably mate within lid aperture 74 aided by the natural resilience of the rubber material used to mold lid seal 76. However, sufficient flexibility is provided in lid seal 76 so that the air pressurization resulting from the squeezing of handle cover 80 as previously described is sufficient to displace lid seal 76 out of lid aperture 74 into the configuration shown in FIG. 1 as the removable straw 52 is upwardly urged by this air pressurization. Note that lid seal 76 also prevents contamination of the upper sipping end of the removable straw 52 when in its stored position.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An insulated drinking container comprising:
   an insulated cup having an open upper end;
   an insulated lid lockably engagable onto said cup upper end whereby liquid may be sealed within said cup;
   said lid having an integrally formed handle for grasping and a centrally positioned, elongated, downwardly disposed straw housing;
   said straw housing having a stationary straw extending downwardly to the bottom of said cup;
   a removable straw closed at its lower end and slidably mountable in said straw housing for up and down movement in response to air pressure within said straw housing, said removable straw having a first position wherein said movable straw is downwardly positioned within said straw housing for storage and a second position wherein said movable straw is upwardly positioned out of an aperture formed in said lid for sipping;

said removable straw having an aperture through a mid point of its wall in fluid communication with the upper end of said stationary straw when said removable straw is in its second position whereby liquid in said container may be withdrawn by sipping the upper end of said removable straw;

means for selectively air pressurizing said straw housing at the lower end of said removable straw whereby said removable straw is urged into its second position.

2. An insulated drinking container as set forth in claim 1, further comprising:

means for creating a vacuum in said straw housing at the lower end of said removable straw whereby said removable straw is urged into said first position.

3. An insulated drinking container as set forth in claim 1, wherein said pressurizing means includes:

a flexible, pliable cover sealably fitted over said handle, said cover sized larger than said handle to form an air chamber therebetween so that air pressure is created in said air chamber when said cover is squeezed;

an air passage in said handle and said lid forming fluid communication between pressurized air in said air chamber and the bottom of said removable straw.

4. An insulated drinking container as set forth in claim 3, said cover includes a cover vent which acts against a protrusion on said handle when said vent is covered by the user's finger and pressed for selective sealing of said air chamber;

said cover creating a vacuum in said air chamber for urging said removable straw into said first position by squeezing said cover, then covering and pressurizing said cover vent with the user's finger, and then releasing cover.

5. An insulated drinking container as set forth in claim 3, wherein:

said removable straw is alternately rotatably lockable in, and removable from, said straw housing.

6. An insulated drinking container as set forth in claim 5, further comprising:

a recess in said cup bottom to accommodate the lower end of said stationary straw and to collect the last remaining liquid in said container for removal.

7. An insulated drinking container as set forth in claim 6, further comprising:

a lid vent allowing air to enter into said container as liquid is removed.

8. An insulated drinking container as set forth in claim 2, further comprising:

a lip sealably fitable into said lid aperture for completely sealing said container to prevent liquid contained therein and within said removable straw from being spilled when said removable straw is in its said first position.

9. An insulated drinking container as set forth in claim 8, wherein:

said lid seal opens automatically by contact with the upper end of said removable straw when said removable straw is urged from said first position to said second position.

10. An insulated drinking container as set forth in claim 9, further comprising:

a lid vent allowing air to enter into said container as liquid is removed;

said lid vent also sealed when said lid seal is closed.

* * * * *